(12) United States Patent
Bouchard et al.

(10) Patent No.: US 8,904,025 B2
(45) Date of Patent: Dec. 2, 2014

(54) SYSTEMS AND METHODS FOR TRAFFIC MANAGEMENT

(75) Inventors: Felix-Antoine R. Bouchard, Ingersoll (CA); Peter M. Olyjnik, Kitchener (CA); Donald Bowman, Waterloo (CA); Steven J. Flatt, Kitchener (CA); David Cameron Dolson, Waterloo (CA)

(73) Assignee: Sandvine Incorporated, Waterloo, ON (CA)

( * ) Notice: Subject to any disclaimer, the term of this patent is extended or adjusted under 35 U.S.C. 154(b) by 183 days.

(21) Appl. No.: 13/568,722

(22) Filed: Aug. 7, 2012

(65) Prior Publication Data

US 2013/0223207 A1 Aug. 29, 2013

Related U.S. Application Data

(60) Provisional application No. 61/602,907, filed on Feb. 24, 2012.

(51) Int. Cl.
*H04J 1/16* (2006.01)
*H04J 1/00* (2006.01)

(52) U.S. Cl.
USPC ............................ 709/231; 709/229; 709/232

(58) Field of Classification Search
USPC .......................................... 370/229, 231, 232
See application file for complete search history.

(56) References Cited

U.S. PATENT DOCUMENTS

| | | | | |
|---|---|---|---|---|
| 7,599,307 | B2 * | 10/2009 | Seckin et al. | 370/252 |
| 8,255,524 | B2 * | 8/2012 | Devitt | 709/224 |
| 8,385,221 | B2 * | 2/2013 | Chetlur et al. | 370/252 |
| 2005/0089043 | A1 * | 4/2005 | Seckin et al. | 370/395.21 |
| 2011/0211464 | A1 * | 9/2011 | Chetlur et al. | 370/252 |
| 2011/0306305 | A1 * | 12/2011 | Huang | 455/67.11 |
| 2012/0110167 | A1 * | 5/2012 | Joch et al. | 709/224 |
| 2013/0219048 | A1 * | 8/2013 | Arvidsson et al. | 709/224 |
| 2013/0223208 | A1 * | 8/2013 | Liao et al. | 370/229 |

* cited by examiner

*Primary Examiner* — Kenny Lin
(74) *Attorney, Agent, or Firm* — Borden Ladner Gervais LLP; Neil Henderson (57) ABSTRACT

The present disclosure provides a system and a method for managing network traffic. The traffic management system has a quality of experience (QoE) measurement module configured to monitor a QoE metric in real-time. A control module is configured to periodically receive the QoE metric and determine a traffic management action based on the QoE metric. A traffic management module is configured to apply the traffic management action to the network traffic.

17 Claims, 11 Drawing Sheets

SYSTEMS AND METHODS FOR TRAFFIC MANAGEMENT

FIELD

The present disclosure relates generally to management of network services. More particularly, the present disclosure relates to systems and methods for traffic management.

BACKGROUND

Conventionally, traffic management systems attempt to avoid congestion by applying traffic management to the types of traffic that are mostly likely to cause congestion. For example, by limiting bandwidth available to users of predetermined types of traffic such as peer-to-peer (P2P) or the like. In other cases, traffic management may manage traffic only during peak hours by limiting bandwidth per user during these peak times. These types of solutions can actually lower QoE by affecting subscribers even in the absence of actual congestion, restricting them from using bandwidth that would otherwise be available to them. Further, these conventional solutions may not actually solve the underlying traffic management problem because the sum of the enforcement policies may still be less than what is required to relieve congestion. For example, there may be few or no heavy users or a low amount or no low priority traffic, such as P2P or bulk downloads, but the network may still suffer from congestion.

It is, therefore, desirable to provide novel and improved traffic management systems and methods.

SUMMARY

In a first aspect, the present disclosure provides a system for managing network traffic, the traffic management system having: a quality of experience (QoE) measurement module configured to monitor a QoE metric in real-time, a control module configured to periodically receive the QoE metric and determine a traffic management action based on the QoE metric, and a traffic management module configured to apply the traffic management action to the network traffic.

In a further embodiment, the system for managing network traffic has a QoE measurement module configured to monitor a QoE metric in real-time, a control module configured to periodically receive the QoE metric and report a traffic management action based on the QoE metric, and a traffic management module configured to receive and apply an adjusted traffic management action to the network traffic.

In another embodiment, a method is provided for managing network traffic by monitoring a QoE metric in real-time, determining a traffic management action based on the QoE metric, and applying the traffic management action in real-time to the network traffic.

In an aspect, the control module has a data store for storing QoE metric data, an analysis module for analyzing the stored QoE metric data and preparing an output action, and an output module for providing or outputting the output action to the traffic management module.

In a further aspect, the analysis module is configured to calculate a variable related to the QoE metric over a time interval. The variable related to the QoE metric may be selected from a group consisting of: a change of the QoE metric, a rate of change of the QoE metric, and a function of the change in the QoE metric and a rate of change of the QoE metric.

The analysis module may be configured to use one or more previous results in analyzing the stored QoE metric data via a feedback loop.

In certain embodiments, the control module has a classification module that is configured to receive classification information related to a characteristic of the network traffic and the traffic management action is also based on the classification information.

In a further aspect, the traffic management action is selected from a group consisting of: shaping traffic flow, reprioritizing traffic flows using PacketCable multimedia, reprioritizing traffic flows using Diameter Gx, reprioritizing traffic flows based on subscriber driven traffic, reprioritizing traffic flows based on machine driven traffic, reprioritizing traffic flows via tunnel endpoint identification rewrites, reprioritizing traffic flows via a bearer creation, receiving a lower priority for downstream enforcement for traffic flows, and packet marking.

In an embodiment, the control system uses logic selected from a group consisting of: adaptive approximation, fuzzy logic, neural networks, genetic algorithms, linear time invariant (LTI) control, and proportional-integral-derivative (PID) control.

The QoE metric may be selected from a group consisting of: an access round trip time, a number of measured retransmitted packets, a number of measured duplicate transmission control protocol (TCP) acknowledgments (ACKS), a measured voice over internet protocol (VOIP) mean opinion score (MOS) value, a time to render a hypertext transfer protocol (HTTP) page, a mean time to HTTP load, a video gaming jitter value, a video gaming latency, a ping response time, a domain name system (DNS) response time, a throughput of bulk transfers, a video quality of experience metric, a third party quality of experience metric, and a result of a speed test.

In an embodiment, the determination of the traffic management action is classifying a traffic flow based on at least one of: a destination cell of a mobile network; a destination node of a mobile network; a destination radio network controller (RNC) of a Third Generation Partner Program (3GPP) mobile network; a destination service general packet radio service support node (SGSN) of a 3GPP mobile network; a destination quadrature amplitude modulation (QAM) of a cable network; a destination Digital Subscriber Line Access Multiplexer (DSLAM) of a Digital Subscriber Line (DSL) network; and a protocol type.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides methods and systems for traffic management which are intended to manage congestion in a network. The methods and systems provided are intended to maintain a desired level of quality of experience (QoE) for users in a network. QoE is a measurement of how well a network is satisfying end users requirements. Typically, high latency, low throughput, jitter in audio, video or gaming are all regarded as providing poor user experience; conversely low latency, high throughput and seamless audio/video/gaming are regarded as providing an expected or good user experience. The methods and systems of the present disclosure may be particularly useful in networks where the network capacity is not known or is highly variable (for example, mobile networks). The methods and systems provided are intended to leverage the coupled nature of QoE and congestion, namely that when congestion occurs, QoE degrades.

The embodiments of the methods and systems described herein are generally configured to measure at least one characteristic indicative of QoE in real-time and then use the resulting measurements to implement one or more traffic management techniques. In particular, the measurements are fed into a control module, which then reviews the measurements to create an output, which is used to select or implement one or more a traffic management actions or technologies, for example, shaping, marking packets, reprioritizing low priority traffic, reprioritizing heavy users on a congested link, etc. Generally speaking, when QoE degrades, the control module may apply additional traffic management techniques, when QoE improves, the control module may apply fewer or no traffic management techniques. By using an appropriate QoE measurement(s), traffic management technology(ies) and a properly configured and tuned control module, the methods and systems are intended to provide a desired amount of traffic management to maintain a desired level of QoE at all times, and, in particular, during times of congestion, without having to know the capacity of the network. In general, the systems and methods are configured to learn the capacity of the network by monitoring QoE.

Figure 1:
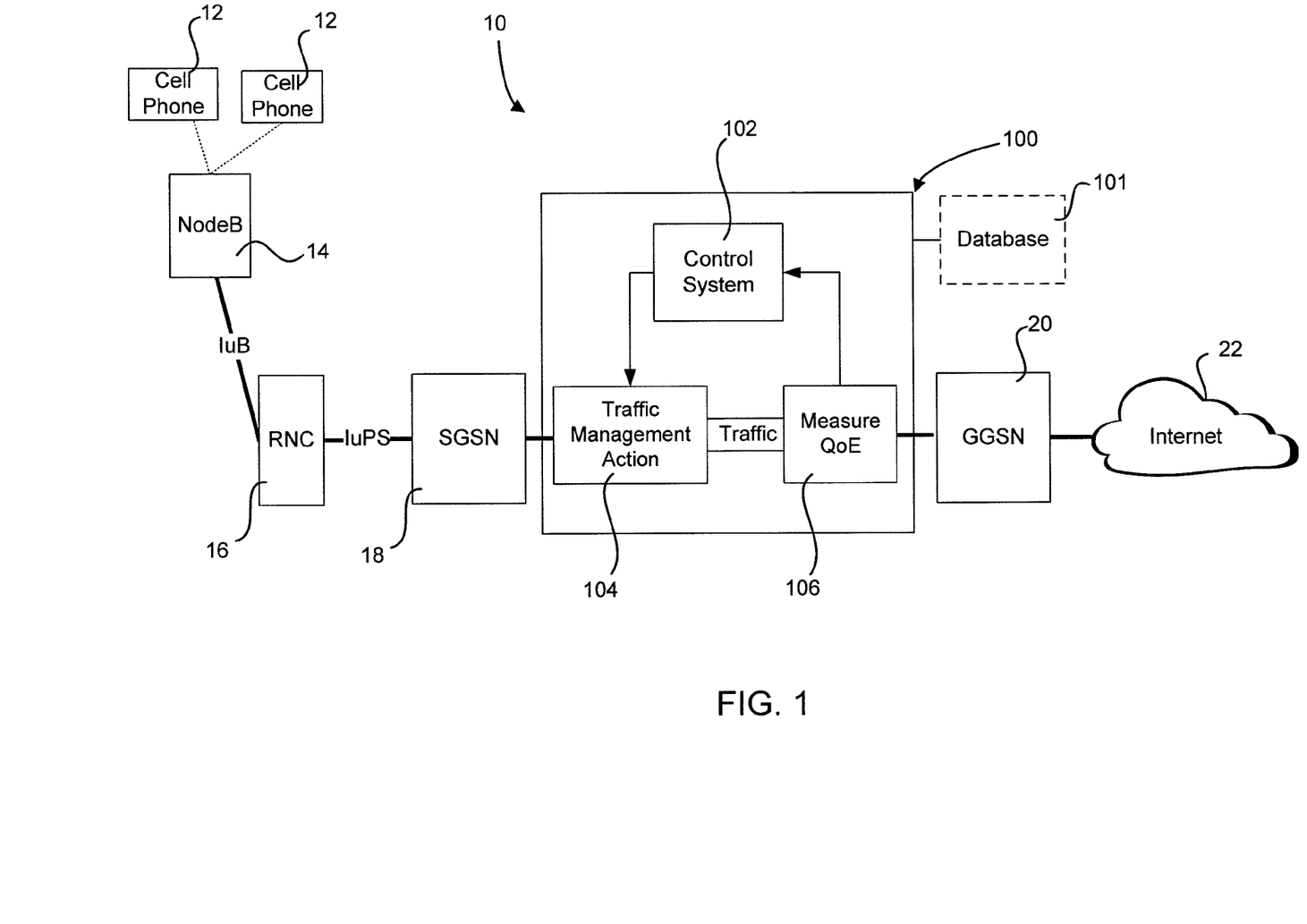
FIG. 1 illustrates an embodiment of a traffic management system on a mobile network.

FIG. 1 illustrates an embodiment of a system for traffic management 100 in a Third Generation Partner Program (3GPP) mobile network 10. The system for traffic management includes a control module 102, a traffic management module 104 and a QoE measurement module 106. In this embodiment, the system 100 is deployed inline such that the control module 102 will have visibility of all traffic passing for downstream nodes. It will be understood that the system 100 may be deployed in other ways or other configurations that still allow monitoring of traffic even if not in-line. Further, it will be understood that the system may alternatively monitor an appropriate subset of all traffic.

The system for traffic management may include a subscriber database 101 for storing data related to network subscribers. The subscriber database 101 may be located internal or external to the system 100 and connected to the system 100 via a network. The subscriber database 101 may be similarly included in networks 30, 40 of FIGS. 2 and 3.

In the mobile network 10, a user device 12, such as a mobile or cellular (cell) phone, may be in communication with a Node B device 14. The Node B device 14 provides an interface to a radio network controller (RNC) 16 (IuB). The RNC 16 is in communication with a serving general packet radio service (GPRS) support node (SGSN) 18 through a packet switch interface (IuPS). In this configuration, the system 100 interfaces with both the SGSN 18 and a gateway GPRS support node (GGSN) 20. The GGSN then communicates with a network 22 such as the Internet. The system 100 can generally be configured or deployed to manage congestion for any link in the hierarchy shown including the IuPS interface, the IuB and the air interface.

Figure 2:
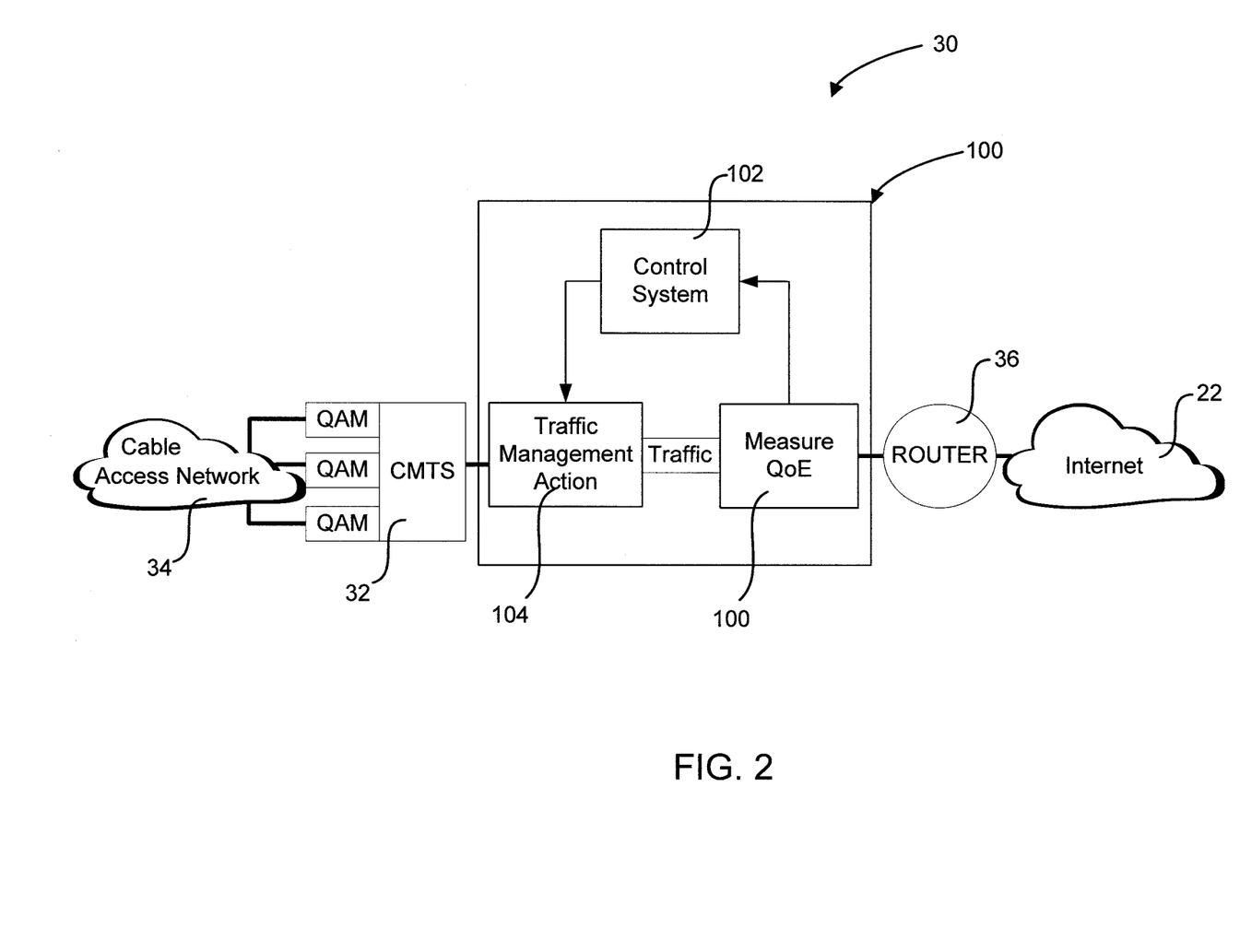
FIG. 2 illustrates an embodiment of a traffic management system placed in a cable network.

FIG. 2 illustrates a cable network 30, where the embodiment of the system 100 is deployed to have visibility of all traffic passing through a cable modem termination station (CMTS) 32, which receives data from a cable access network 34. The system 100 may manage congestion at the aggregate CMTS level or any channel (for example, Data Over Cable Service Interface Specification (DOCSIS 3)) below it, by determining and adjusting to the CMTS/channel capacity. In this embodiment, the system 100 would also be connected to the Internet 22 through a router 36.

Figure 3:
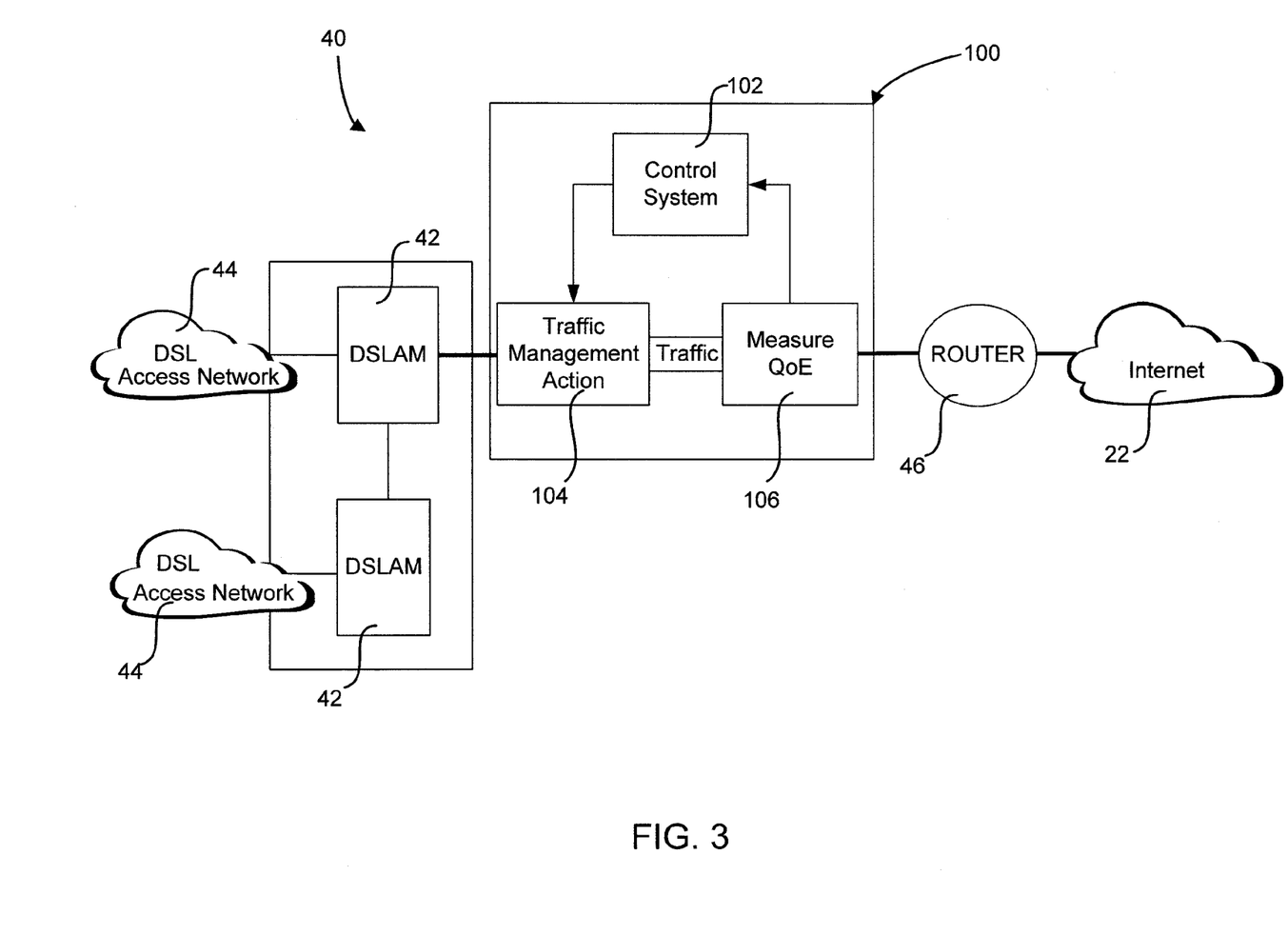
FIG. 3 illustrates an embodiment of a traffic management system placed in a DSL network.

FIG. 3 illustrates an embodiment of the system 100 in a Digital Subscriber Line (DSL) network 40. In this network topology, two co-located Digital Subscriber Line Access Multiplexers (DSLAMs) 42 share a backhaul link and are connected to a DSL Access Network 44. Even though the utilization on the inner link may be unknown to the system 100, the system 100 would be capable of relieving congestion on either DSLAM 42 based on the quality of experience of the subscribers the DSLAM 42 services. In this configuration, the system 100 is able to apply traffic management techniques to traffic received from the Internet 22 through a router 46.

It will be understood that a system similar to the system 100 could be deployed on other networks, for example, a Long Term Evolution (LTE), 3rd Generation Partnership Program (3GPP) 3GPP2, WiMax, Cable or the like. The system 100 could also be deployed at various levels of topology in a network where the system 100 has appropriate visibility of the traffic flowing to or from a node. In this disclosure, where appropriate, a node refers to any logical grouping of traffic where the QoE of the traffic measured may be impacted by managing the traffic at that point.

The system 100 is intended to use traffic management to control the supply of or access to one or more fixed resources, for example, controlling total bandwidth, limiting high priority bandwidth or traffic, limiting low priority bandwidth or traffic, limiting subsets of traffic by netclasses, etc., with the aim of improving or maximizing the QoE of subscribers within the constraints of the fixed resources. In order to accomplish this aspect, the system determines current fixed resource capacity and may restrict supply to an amount that provides improved QoE according to predetermined policies. In some cases, the system 100 may be the sole source of policing in the network.

In one embodiment, the method used by the system 100 may employ an underlying hypothesis that there is an ideal traffic rate M(t) for a fixed resource which is unknown to the network (for example, CMTS rate, DSLAM rate, Node B, or the like, depending on the network). The system 100 does not require that the ideal traffic rate M(t) remain static. Once the system 100 adjusts the supply to this ideal traffic rate M(t), the system 100 then continues monitoring to allow the system 100 to adapt to changes in the ideal traffic rate M(t) over time.

In particular, the system 100 receives QoE measurements from the QoE measurement module 106 and reviews the data such that an output value O(t) is determined. The control module 102 (working with the traffic management module 104) is configured such that the output value O(t) will converge on the unknown value of M(t) over time. Further, as the system 100 continues to receive QoE measurements, the control module 102 works to dynamically re-converge on M(t) in the event that the value of M(t) changes.

Figure 4:
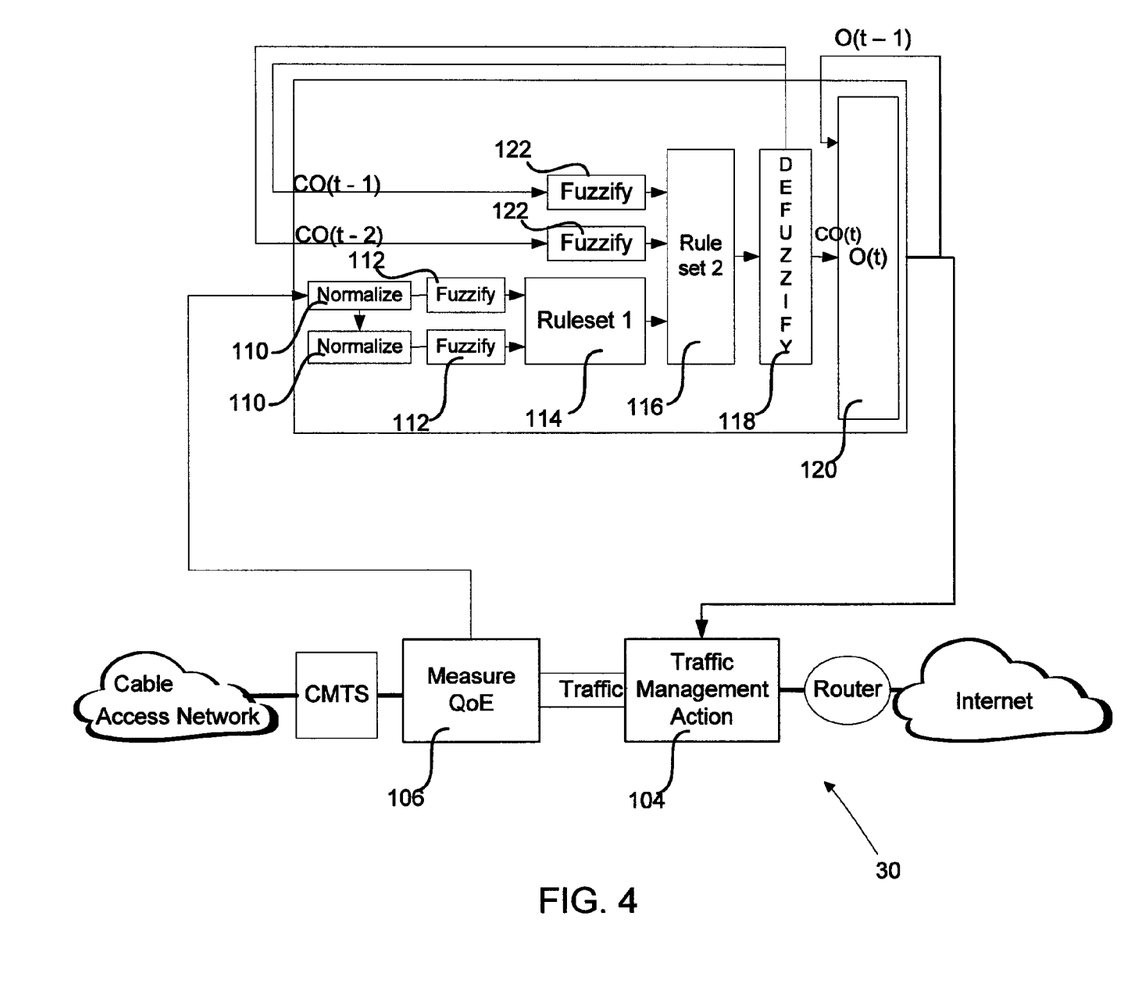
FIG. 4 further details an embodiment of an embodiment of a traffic management system as in FIG. 2.

FIG. 4 illustrates one embodiment of the system 100 showing the control module 102 in more detail. In this case, the system 100 is in a cable network 30 and the control module 102 is using fuzzy logic control as a method of controlling traffic management.

When a subscriber has an active session or creates a new session on the Internet, traffic for that subscriber will flow through the QoE measurement module 106, which is configured to measure and/or monitor the subscriber's QoE. The QoE metric could be one of, or a combination of, for example, the access round trip time (aRTT), unidirectional delay, duplicate transmission control protocol (TCP) acknowledgment (ACKS), voice over internet protocol (VOIP) mean opinion score (MOS), hypertext transfer protocol (HTTP) mean time to page load, HTTP mean time to page render, TCP retransmits, domain name system (DNS) response time, throughput of bulk transfers, ping response time, gaming jitter, gaming latency, video jitter, video QoE, speed test, other 3rd party QoE measurement or the like. It will be understood that some metrics may be more or less applicable/available depending on the location of the system 100 in a network. Further, it will be understood that the system 100 is intend to work with any appropriate QoE metric, now known or hereafter developed. The metric or metrics measured are then passed to the control module 102. Still further, it will be understood that the QoE measurement module 106 may also receive and monitor QoE measurements received from another source that is configured to measure QoE.

In FIG. 4, QoE metric measurements measured by the QoE measurement module 106 are transmitted to at least one normalization module 110 (two modules shown), which normalizes the measurements prior to transmitting the normalized measurements to at least one fuzzy logic module 112 (two modules shown). It will be understood that the control module 102 may also use the raw measurement itself rather than a normalized value but this may require amending boundaries on the input fuzzy sets. It will further be understood that the number of normalization modules 110 and the like may depend on the number of QoE metrics being monitored.

After application of the fuzzy logic by the fuzzy logic module 112, the modified measurements are transmitted to a rule set component 114, which applies predefined rules to the modified measurements to provide a ruleset output.

In this embodiment, the ruleset output is passed into a second rule set component 116 where the ruleset output may be combined with results from previous time intervals, as described herein. The second ruleset output is then processed by a logic module 118 configured to apply logic to defuzzify the measurements. The resulting crisp output CO(t) is transmitted to an output module 120 and an output O(t) is sent to the traffic management module 104 where traffic management actions may be applied to the traffic based on the output as described herein. The output O(t) may be equivalent to the crisp output value CO(t), which can be interpreted by the traffic management module 104 such that an appropriate traffic management action may be applied to the network, or the output O(t) may be a traffic management action itself which can be initiated by the traffic management module 104.

The crisp output CO(t) may also be transmitted to at least one fuzzy logic module 122, which may be a separate module than the at least one fuzzy logic modules 112 or may be integrated as part of the same fuzzy logic module. In this case, the crisp output CO(t) may be marked as the crisp output from a previous time interval, for example CO(t−1). The fuzzy logic modules 122 are intended to apply fuzzy logic to the crisp outputs for a number of previous time intervals, for example the last two time intervals, CO(t−1) and CO(t−2). The modified outputs of these previous time intervals are then combined in the second rule set component 116 with the current time output to create a second ruleset output that passes through the output module and then transmitted to the traffic management module 104.

Although the present disclosure describes how the method can be applied using fuzzy logic, similar methods can be implemented using a neural network controller, a controller utilizing genetic algorithms, or other appropriate adaptive approximation based control now known or hereafter developed. For example, a normalized QoE measurement input could be used as an input to an artificial neural network, where the fuzzy modules and rules may be replaced by a fitness function with configured hidden nodes. In this example, the output may be treated in the same or very similar manner to the described fuzzy logic controller system output as described herein.

Figure 5A:
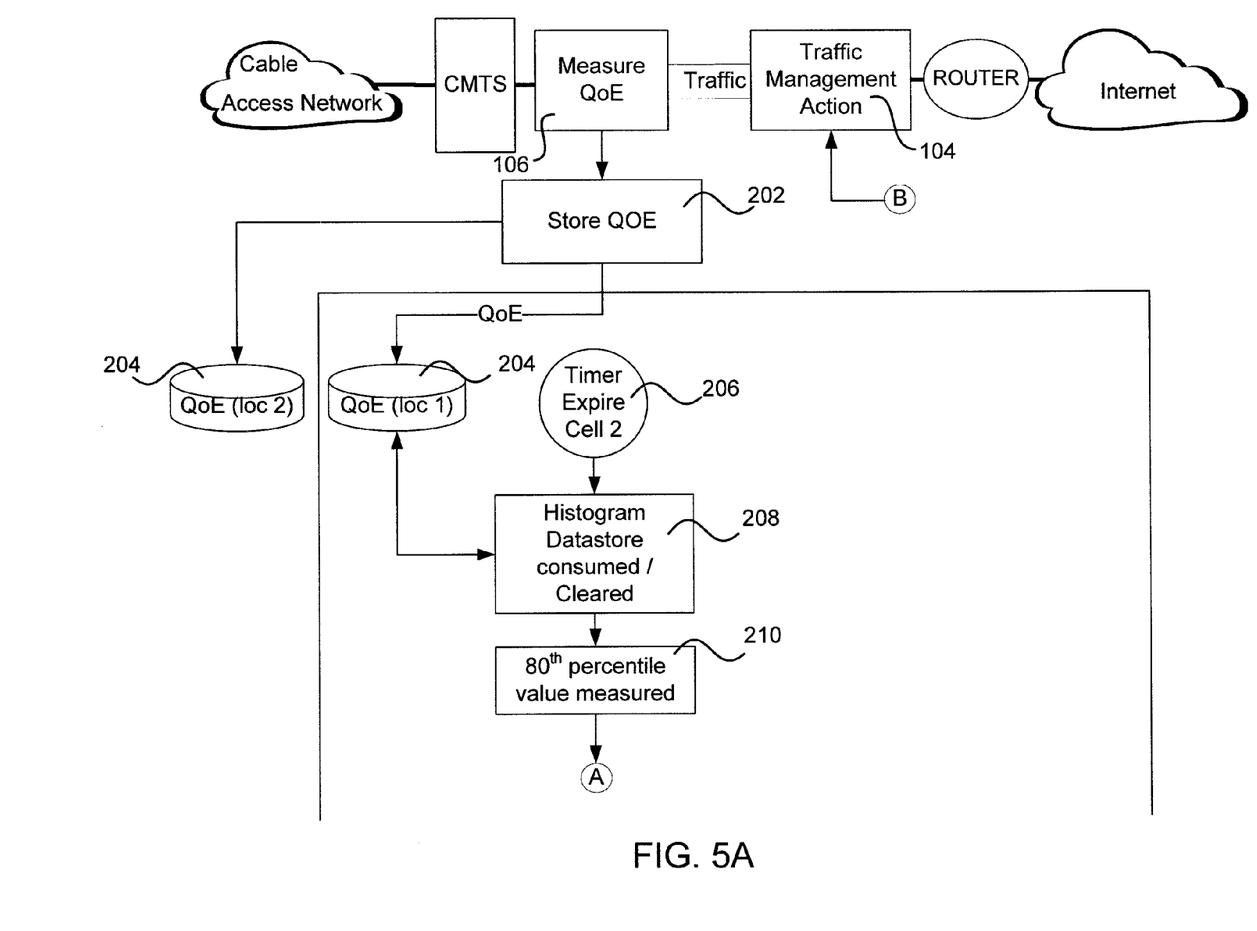
FIGS. 5A and 5B is a flow chart of a method for traffic management.
Figure 5B:
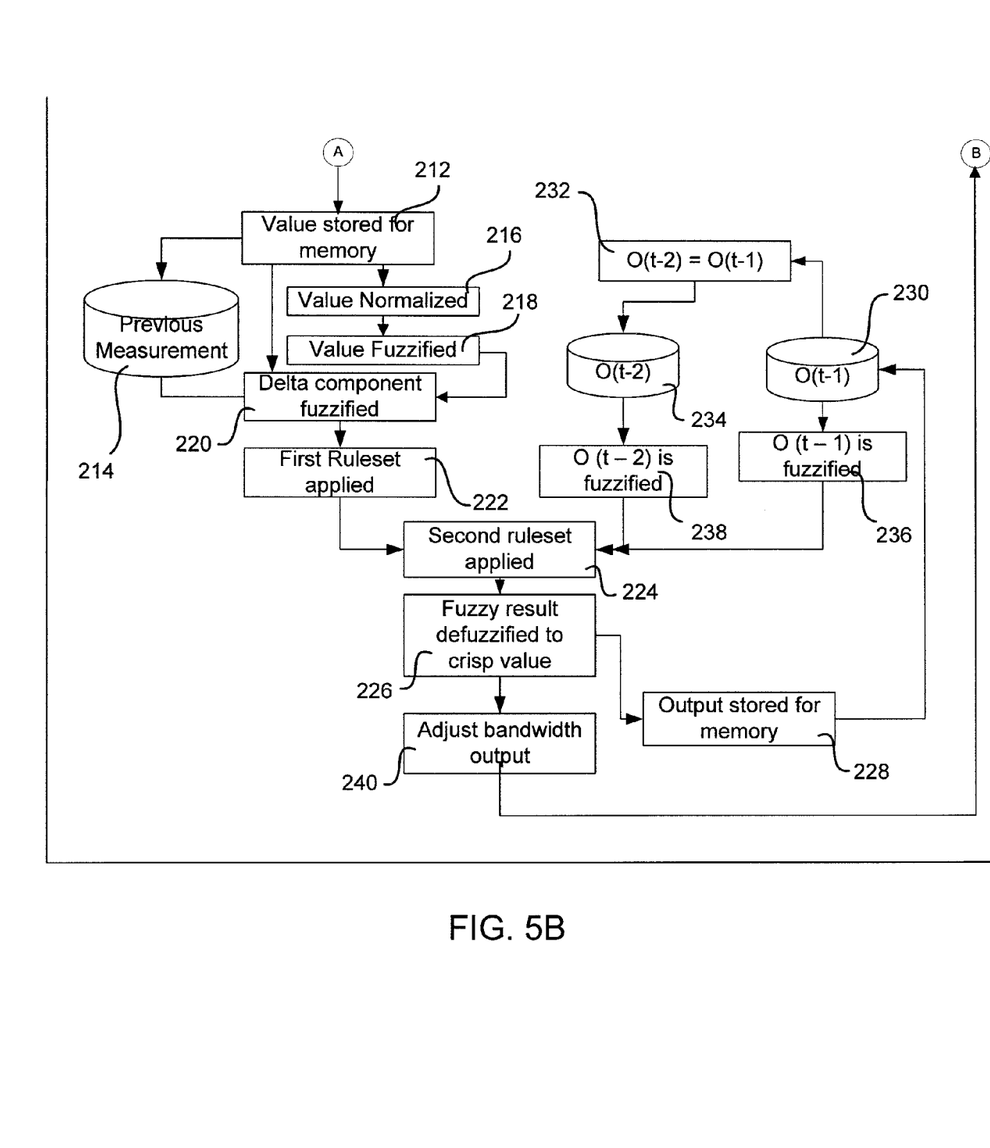

FIGS. 5A and 5B illustrate a flow chart of an embodiment of a method for traffic management 200. The method may be implemented by a control module similar to that of the control module 102 illustrated in FIG. 4. When the QoE measurement module 106 measures at least one QoE metric, the at least one QoE metric is stored 202 in at least one datastore 204. The datastore 204 may be used for all samples taken for a resource being controlled. For example, if the resource being controlled is a cell in a 3GPP wireless network, then all new flows or a sufficient subset of flows that are relevant for that cell would be sampled for their QoE and each one or a subset may be stored in the datastore 204.

In an example, if the QoE metric used is access round trip time (aRTT), then all new transmission control protocol (TCP) flows would be measured for their respective aRTT value. In a particular example, the TCP aRTT may be measured as the time between synchronization sequence number (SYN) and SYN-ACK in a new subscriber server TCP session, and time between a SYN-ACK and ACK in a new subscriber client TCP session.

In another example, if the QoE metric used were voice over Internet protocol (VOIP) mean opinion score (MOS), then each VOIP call may be periodically sampled for the call quality (indicated by a MOS value). If a separate cell were also being controlled, the samples for that cell may be measured and stored in a separate or integrated datastore 204.

In one implementation, the datastore 204 may store data in the form of a histogram, where memory of the raw value of the measurement may be lost as a single bin in the histogram is incremented. One advantage of a histogram is that the control module 102 can operate on more data without impacting the datastore 204 of the system 100. Alternatively, all samples could be stored, with a bin for every possible value, although this method may require greater memory capacity.

In one implementation, the datastore 204 may store an aggregate value of each sample. Aggregate values for each sample may be, for example, the maximum measured value, the minimum measured value, and/or the average of all values.

The control module 102 may include a timer, which expires on a preset interval 206, for example every millisecond, every second, every minute, etc. When the timer expires 206, the measurements from previously stored time intervals will be consumed 208 and the datastore may then be cleared. In an alternative, the measurements may be stored for reporting purposes for a network operator. Also, measurements may be stored in some cases where the control module has multiple consumers. A single metric can apply to multiple control modules where the control modules operate in a hierarchy. For example a control module 102, which operates on a 3GPP cell, and a control module which operates on an upstream 3GPP RNC may share the same measurement since the same flow exists on both nodes.

The histogram of the measured metric is analyzed by the control module 102 and a raw measurement is extracted 210 which, in one example, represents the $80^{th}$ percentile value of all of the samples that had been previously measured. Although $80^{th}$ percentile is shown here as an example, any appropriate percentile, in the range from 0 to 100 may be selected. Other selection criteria may also be selected depending on the metric used, the measurements received and the shape of the histogram. The value may then be stored 212 in a memory component 214 of the control module 102.

After the raw measurement is stored, the measurement is fed to the normalization module 110, which normalizes the score 216 into a range from, for example, 0 to 100. It will be understood that other ranges may be used depending on the normalization function used. The score is then modified by the fuzzy logic module 112 such that the score becomes a fuzzified value 218.

In some cases, the QoE metric measurement may also be compared with a previous measurement stored in the control module 102. In this case, the change in value over time may be normalized then have fuzzy logic applied to the normalized value 220 by the fuzzy logic module 112.

In one example, the two values are analyzed 222 by the rule set module 114 using a fuzzy set $\overline{Q\&\partial Q} \in \{VG,G,Z,B,VB\}$, where, for example, $\overline{Q\&\partial Q}$ are the fuzzy values of the QoE metric and the change in the QoE metric and where the set is {Very Good, Good, Zero, Bad, Very Bad}. The set is further illustrated in FIG. 6, when the values used range between 0 and 100 and the boundaries for each element are marked. The values are analyzed by the rule set component 114, which may include determining the memberships in each set, which may be calculated based on the values of the scores relative to the boundaries of the sets. For example, a score of 65 would belong to both the G and Z sets with respective memberships. It will be understood that although the fuzzy sets in this example are shown with 5 values, using 5 triangles, other numbers of triangles, for example, 3, 7, 9 etc., may be used.

Figure 6:
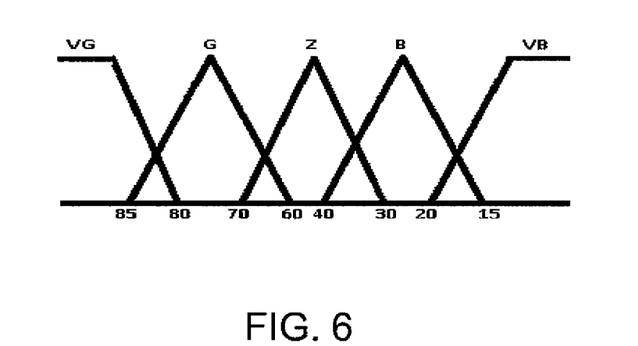
FIG. 6 is a graph showing an input fuzzy set.

For example:

QoE($Q$): Crisp value of 55, $\mu(Z)$=035, $\mu(G)$=0.0, else 0

$\partial$QoE ($\partial Q$): Crisp value of 65, $\mu(Z)$=0.25, $\mu(G)$=0.4, else 0

The following rule set may be applied 222 to the fuzzy inputs in order to produce a membership in the output set as shown in Table 1: First Rule Set.

TABLE 1

First Rule Set

|  |  | Q |  |  |  |  |
| --- | --- | --- | --- | --- | --- | --- |
| ∩ |  | VB | B | Z | G | VG |
| $\partial$Q | VB | BD | BD | SD | SD | SD |
|  | B | BD | BD | SD | SD | Z |
|  | Z | SD | SD | SD | Z | Z |
|  | G | SD | SD | Z | Z | SI |
|  | VG | SD | Z | Z | SI | BI |

Each intersection in the above matrix results in an AND rule. For example, the intersection of Q and $\partial$Q, where each of Q and $\partial$Q have a score within the Z region can be expressed as the following rule:

If there is zero change in QoE ($\partial$Q is Z), AND the current QoE measurement is mediocre (Q is Z), THEN perform a slight decrease on the output (O is SD).

As in standard fuzzy theory, every single rule is applied to the fuzzy input set, and the result will be a set of memberships in the output result set $\overline{O} \in \{BD,SD,Z,SI,BI\}$ {Big Decrease, Small Decrease, Zero, Small Increase, Big Increase}.

So if we were to continue the previous example:

Inputs from previous example:

QoE($Q$): $\mu(Z)$=0.75, $\mu(G)$=0.0

$\partial$QoE($\partial Q$): $\mu(Z)$=0.25, $\mu(G)$=0.4

Rules applied:

$\mu(Z)Q \cap \mu(Z)\partial Q$: min(0.25,0.4)=0.25(SD)

$\mu(Z)Q \cap \mu(G)\partial Q$: min(0.75,0.4)=0.4(Z)

Fuzzy result:

$\mu(BD)$=0.0, $\mu(SD)$=0.25, $\mu(Z)$=0.4, $\mu(SI)$=0.0, $\mu(BI)$=0.0

This fuzzy result represents that the above inputs to the system result in membership in SD of 0.25 and in Z of 0.4. According to standard fuzzy theory, the membership in all other sets would be considered 0.

Figure 7:
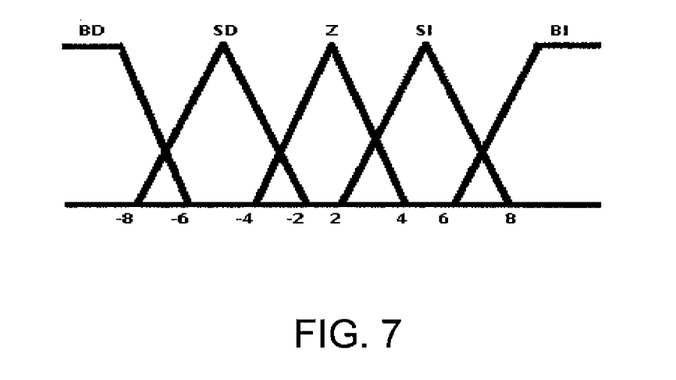
FIG. 7 is a graph showing an output fuzzy set.

The output after the application of the logic applied by the rule set component 114 will then be transmitted to the second rule set component 116 in order to be combined with outputs from previous time intervals. For example, the second rule set component 116 may combine the output with the outputs from the last two time intervals. It will be understood that more or fewer intervals could be used depending on the desired outcome. The second rule set component 116 analyzes the outputs using the output fuzzy set $\overline{O}$ with, for example, the boundaries shown in FIG. 7. The second rule set component 116 may calculate memberships in each set by determining the values of the former outputs relative to the boundaries of the sets. For example:

O(t–1): Crisp value–3.3, $\mu(SD)$=0.43, $\mu(Z)$=0.175, else 0

O(t–2): Crisp value=–2.2, $\mu(SD)$=0.07, $\mu(Z)$=0.4, else 0

The above results in 3 fuzzy sets in the $\overline{O}$ fuzzy space (input which resulted from QoE/$\partial$QoE, Output (t–1), Output (t–2)). The second rule set of table 2 can be applied 224 with the inputs. It will be understood that the rule matrix will be modified accordingly if fewer or more time intervals were used.

TABLE 2

Second Rule Set

| O(t-2) | O(t-1) | I | | | | |
|--------|--------|-----|-----|-----|-----|-----|
| | ∩ | BD | SD | Z | SI | BI |
| BD | BD | BD | SD | SD | Z | Z |
| BD | SD | BD | SD | SD | Z | SI |
| BD | Z | SD | SD | Z | SI | SI |
| BD | SI | SD | SD | Z | SI | SI |
| BD | BI | SD | SD | Z | SI | SI |
| SD | BD | BD | SD | SD | SD | Z |
| SD | SD | BD | SD | Z | Z | SI |
| SD | Z | SD | SD | Z | SI | SI |
| SD | SI | SD | Z | Z | SI | SI |
| SD | BI | SD | Z | Z | SI | BI |
| Z | BD | BD | SD | SD | Z | SI |
| Z | SD | BD | SD | Z | Z | SI |
| Z | Z | SD | SD | SI | SI | SI |
| Z | SI | SD | Z | Z | SI | BI |
| Z | BI | SD | Z | SI | SI | BI |
| SI | BD | BD | SD | Z | Z | SI |
| SI | SD | SD | SD | Z | Z | SI |
| SI | Z | SD | SD | Z | SI | SI |
| SI | SI | SD | Z | Z | SI | BI |
| SI | BI | Z | SD | SI | SI | BI |
| BI | BD | SD | SD | Z | SI | SI |
| BI | SD | SD | SD | Z | SI | SI |
| BI | Z | SD | SD | Z | SI | SI |
| BI | SI | SD | Z | SI | SI | BI |
| BI | BI | Z | Z | SI | SI | BI |

Each intersection in the above matrix results in an AND rule. For example, the entry of O(t-1) as SI, O(t-2) as BD and I as SD can be expressed as the following rule:

If the output from 2 iterations passed was a small increase (O(t-2) is SI) AND the output from 1 iterations passed was a big decrease (O(t-2) is BD) AND the newly recommended output based on QoE and dQoE is a small decrease (I is SD), THEN output should be a small decrease (O is SD).

As in standard fuzzy theory, every single rule is applied to the fuzzy input set, and the result will be a set of memberships in the output result set $\overline{O} \in \{BD, SD, Z, SI, BI\}$, as previously described would be the set of {Big Decrease, Small Decrease, Zero, Increase, Big Increase}, previously illustrated. For example:

Inputs:

I (from previous example): fuzzy value ($\mu(SD)=0.25$, $\mu(Z)=0.4$, else=0)

$O(t-1)$: Crisp value=-3.3x, $\mu(SD)=0.43$, $\mu(Z)=0.175$ $O(t-2)$: Crisp value=-2.2x, $\mu(SD)=0.07$, $\mu(Z)=0.45$ Rules applied:

$\mu(SD)O(t-2) \cap \mu(SD)O(t-1) \cap \mu(SD)I$=min(0.07,0.43, 0.25)=0.07(SD)

$\mu(SD)O(t-2) \cap \mu(SD)O(t-1) \cap \mu(Z)I$=min(0.07,0.43, 0.4)=0.07(Z)

$\mu(SD)O(t-2) \cap \mu(Z)O(t-1) \cap \mu(SD)I$=min(0.07,0.175, 0.25)=0.07(SD)

$\mu(SD)O(t-2) \cap \mu(Z)O(t-1) \cap \mu(Z)I$=min(0.07,0.175,0.4)=0.07(Z)

$\mu(Z)O(t-2) \cap \mu(SD)O(t-1) \cap \mu(SD)I$=min(0.45,0.43, 0.25)=0.25(SD)

$\mu(Z)O(t-2) \cap \mu(SD)O(t-1) \cap \mu(Z)I$=min(0.45,0.43, 0.4)=0.4(Z)

$\mu(Z)O(t-2) \cap \mu(Z)O(t-1) \cap \mu(SD)I$=min(0.45,0.175, 0.25)=0.175(SD)

$\mu(Z)O(t-2) \cap \mu(Z)O(t-1) \cap \mu(Z)I$=min(0.45, 0.175,0.4)=0.175(Z)

Fuzzy result:

Max(0.07,0.07,0.25,0.175)=0.25SD

Max(0.07,0.07,0.4,0.175)=0.4Z

Once the second rule set has been applied 224, the result may be rendered into a crisp value 226 by the logic value 118, or in other words, the value may be defuzzified to turn the aforementioned fuzzy output result into a 'crisp', discreet output which exists within the universe of discourse of the output. The input to the defuzzification process is a set of membership functions for each possible output result.

The algorithm to use for defuzzification may be the centroid method (or center of gravity). This can be computed by performing the weighted sum of the membership functions to center values. (The center value is the boundary of an output where the membership function evaluates to 1).

Example:

$$\frac{\mu(X)*X_0 + \mu(Y)*Y_0 + \mu(Z)*Z_0}{\mu(X) + \mu(Y) + \mu(Z)}$$

Inputs (from previous example): 0.25SD, 0.4Z, else 0

$$\frac{\mu(BD)*BD_m + \mu(SD)*SD_m + \mu(Z)*Z_m + \mu(SI)_m + \mu(BI)*BI_m}{\mu(BD) + \mu(SD) + \mu(Z) + \mu(SI) + \mu(BI)}$$

$$\frac{0*-10 + 0.25*-5 + 0.4*.0 + 0*5 + 0*10}{0 + 0.25 + 0.4 + 0 + 0}$$

Crisp value: −1.92

It will be understood that other defuzzification algorithms may be applied, for example, adaptive integration, basic defuzzification distributions, constraint decision defuzzification, extended center of area, extended quality method, fuzzy clustering defuzzification, fuzzy mean, first of maximum, generalized level set defuzzification, indexed center of gravity, influence value, last of maximum, mean of maxima, middle of maximum, quality method, random choice of maximum, semi-linear defuzzification, weighted fuzzy mean, or other defuzzification algorithms.

This crisp output value, CO(t), is then stored 228 in a memory component 230. The previous output O(t−1) replaces O(t−2) 232 and is stored in a memory component 234 and indexed as O(t−2), as both outputs may be used during the next interval. Prior to being reintroduced to the second rule set component 116, both the crisp value of O(t−1) is translated through fuzzy logic 236 by a fuzzy logic module 122 and the crisp value of O(t−2) is translated similarly 238.

In this embodiment, the crisp value output is then delivered 240 to the traffic management module 104. The traffic management module 104 then performs a traffic management action based on the desirable actions with respect to the output. In the above example, the output may have a range from −10 . . . 10 (based on boundaries of output fuzzy set), and depending on the value received, the desired traffic management action may vary as described herein. In an alternative, the control module 102 may determine the traffic management action to be applied and may transmit a signal to the traffic management module 104 to apply the traffic management action.

Figure 8:
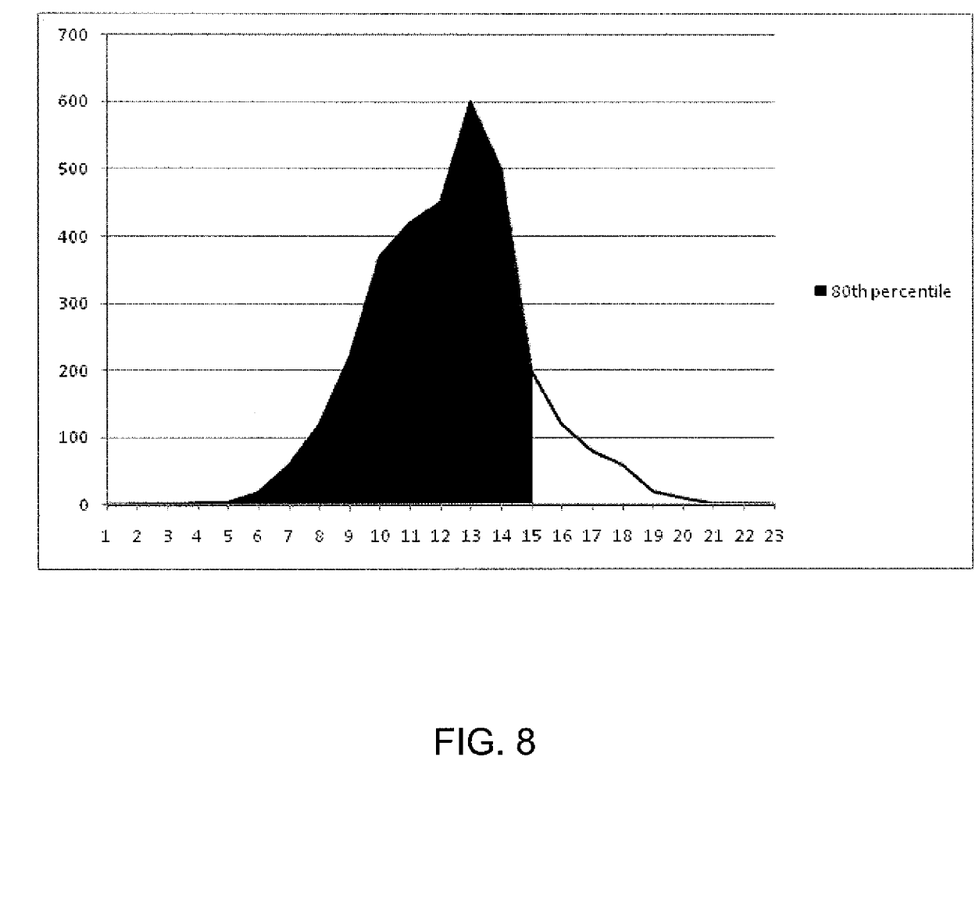
FIG. 8 is a graph showing a round trip time (RU) distribution over controller interval.
Figure 9:
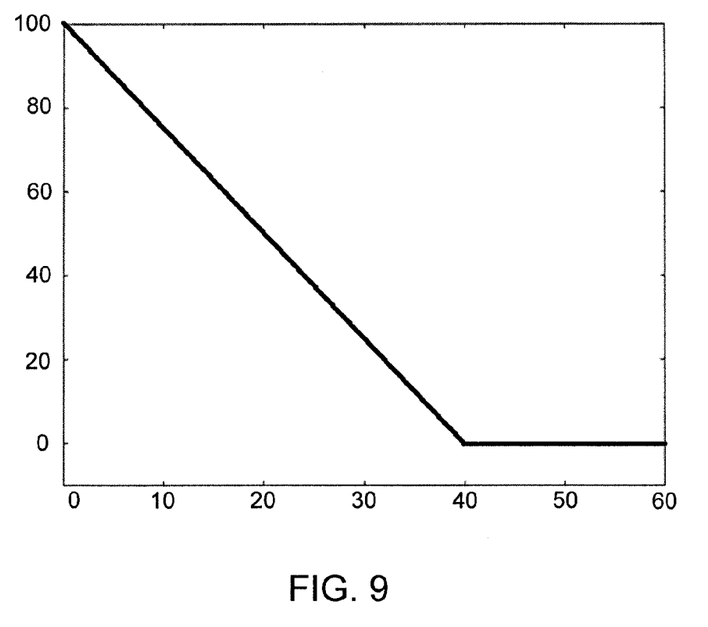
FIG. 9 is a graph showing a latency score normalization function.

In a specific example, the quality measurement metric input may be an aRTT sample. A histogram is created from the aRTT measurements as shown in FIG. 8. The histogram may be analyzed and a measurement may be calculated by retrieving aRTT measurements in real time at specific time intervals, for example every 5 or 10 seconds, although other time intervals could be used. FIG. 8 illustrates a crisp aRTT measurement of 15 milliseconds (ms). The retrieved value is then converted to a value ranging from 0 . . . 100 by applying a transfer function, for example, such as shown in FIG. 9.

In the case of aRTT, which is a measure of latency, optimization of the QoE metric is characterized by minimizing the aRTT value for the new traffic on the network. In FIG. 9, the X axis of the graph denotes the raw measurement value (latency in ms), and the Y axis the output score between 0 and 100. For example, a raw input value of 15 ms would yield the score of 62.5, and a raw value of 50 ms would provide a score of 0. In this manner, a latency measurement of 0 ms would indicate high quality, and any latency greater then 40 ms would indicate a low quality of experience depending on the typical latency a subscriber has come to expect in a network.

Figure 10:
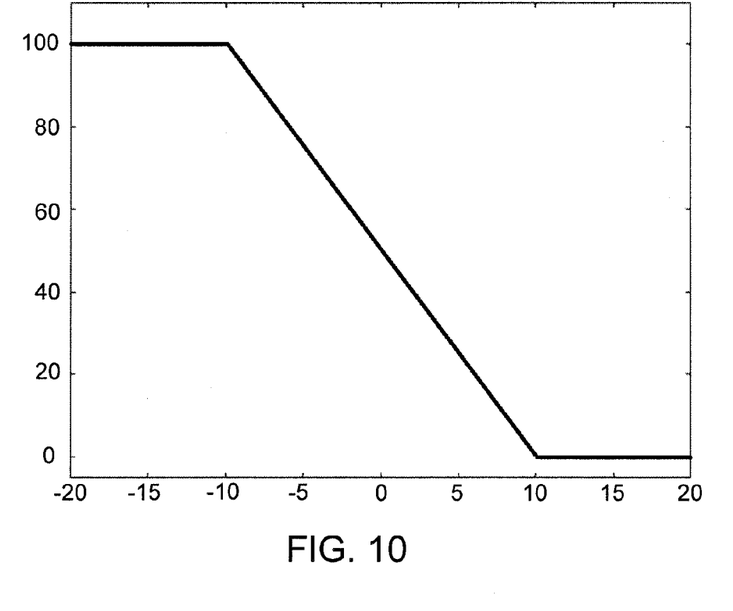
FIG. 10 is a graph showing a delta latency score normalization function.

The QoE measurement, which in this specific example is an aRTT value of 15 ms, is then compared against the last measurement reading from the control module 102, and the change in this value is also converted into a value ranging from 0 . . . 100 by applying a different transfer function such as shown in FIG. 10.

The X axis of the graph shown in FIG. 10 denotes the raw measurement value (change in latency in ms), and the Y axis the output score between 0 and 100. For example, a raw input value of 5 indicates that the 80th percentile aRTT value has increased by 5 ms over the sample interval, and would yield the score of 20, and a raw value of −5, which would indicate that the 80th percentile aRTT value decreased in latency by 5 ms over the sample interval and would provide a score of 60. In this manner, a change in latency of 10 ms decrease over the sample interval would indicate drastically increasing QoE, and any delta latency greater then 10 ms over the sample interval would indicate a significant decrease in QoE. These values from 0 . . . 100 (latency score, delta latency score) serve as the QoE measurement inputs to the control module 102 in the example where aRTT is used as a QoE measurement metric.

Figure 11:
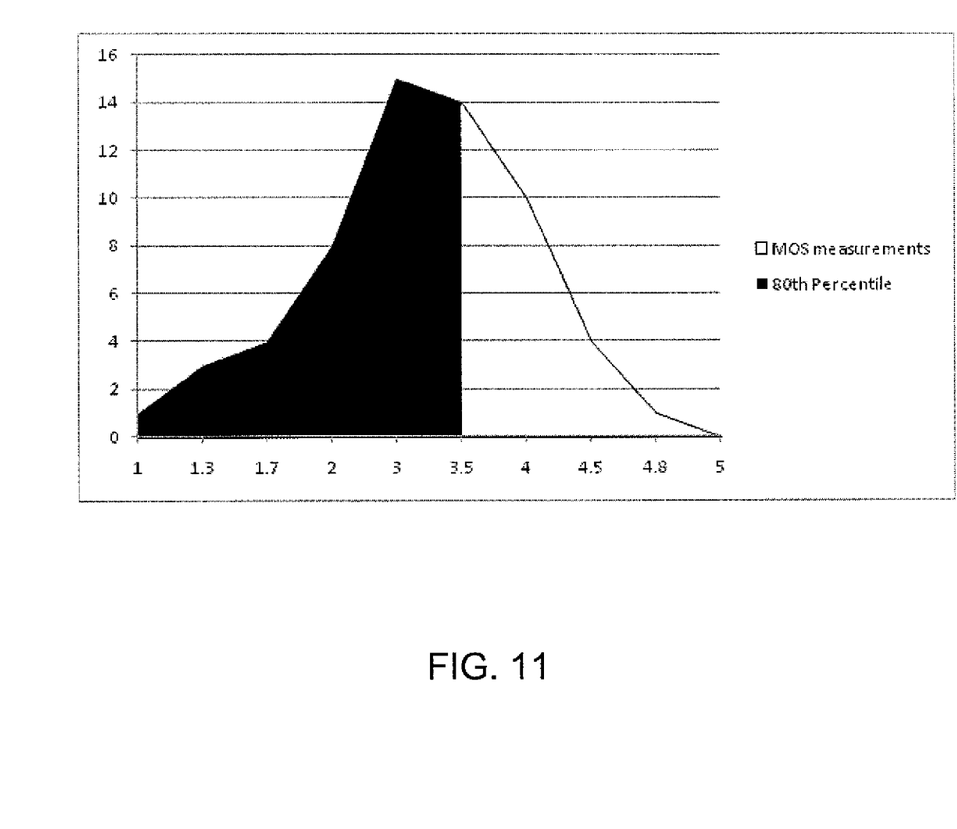
FIG. 11 is a graph showing a mean opinion score (MOS) value distribution over controller interval.
Figure 12:
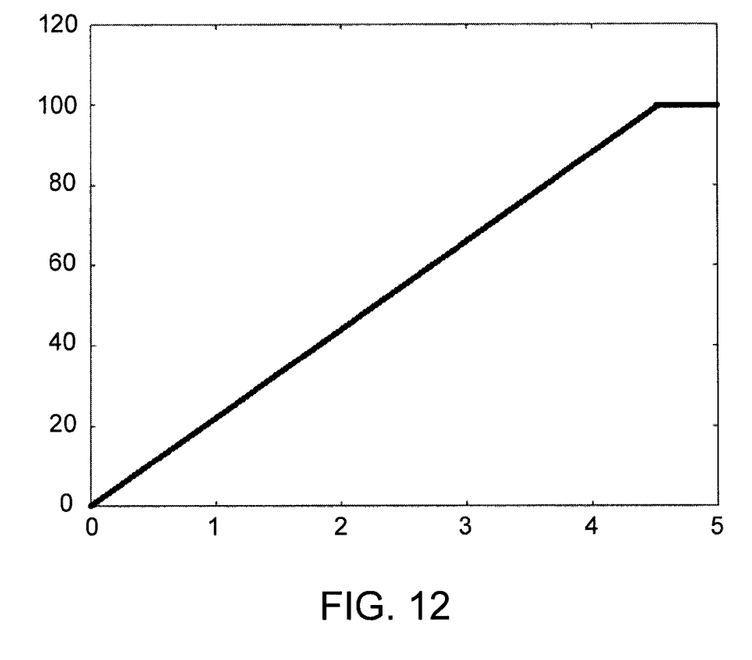
FIG. 12 is a graph showing a MOS value normalization function.

In another example, MOS values may be used as the QoE measurement metric. FIG. 11 provides an example distribution of MOS values as a QoE metric type. As in the case of aRTT, the histogram of measurement is analyzed and a raw measurement is extracted which represents, for example, the 80th % percentile value of all of the samples that had been previously measured. A similar transfer function as was used in the aRTT example may be applied to the measurement, resulting in the graph shown in FIG. 12.

Figure 13:
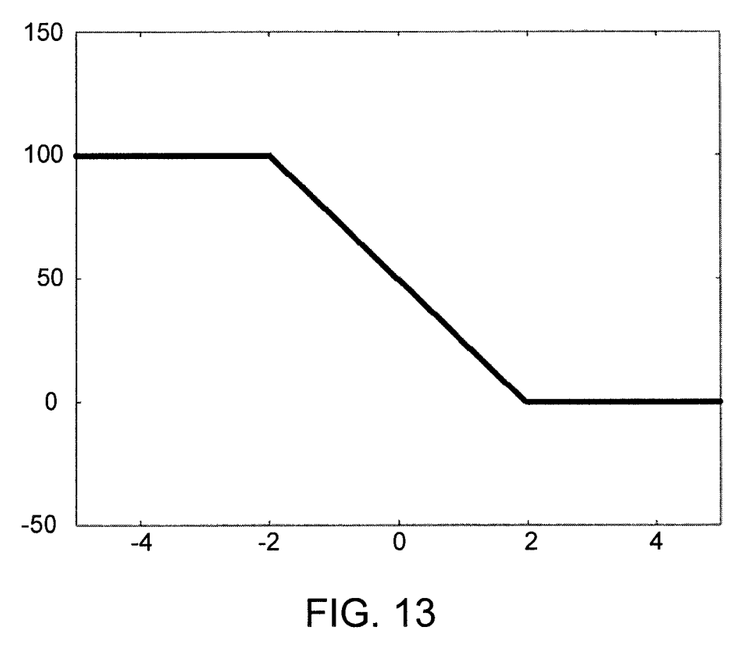
FIG. 13 is a graph showing a delta MOS value normalization function.

As in the aRTT example, the previous MOS value is compared against the current MOS value, and a normalization function is applied to the value to produce a score from 0 . . . 100, as in shown in FIG. 13. These 2 values (MOS value, delta MOS value) would serve as the QoE measurement inputs to the control module 102.

It will be understood that the system and method are not limited to the QoE metrics of aRTT and MOS values. Other QoE metrics may be measured and similar conversions may be to applied to other QoE metrics, for example, unidirectional delay, duplicate TCP ACKS, HTTP mean time to page load, HTTP mean time to page render, TCP retransmits, DNS response time, throughput of bulk transfers, ping response time, gaming jitter, gaming latency, video jitter, video QoE, speed test, 3rd party QoE measurement, or the like. The QoE measurement module 106 may measure a QoE metric at a predetermined interval and compare this measurement to a previous value obtained on the previous interval and normalize both these measurements to be used as the QoE measurement metric input to the control module 102.

As described above, once the control module 102 has analyzed the QoE measurement metrics and performed the logic on these metrics as described herein, the control module 102 transmits the output to the traffic management module 104. The traffic management module 104 will perform a desired traffic management action based on the value received. The desired actions may be predetermined and may be mapped to specific values or value ranges the traffic management module may receive from the control module. The traffic management action may be predetermined by a network operator (for example, based on a policy) and/or may include one or a combination of actions designed to manage network congestion.

The traffic management module 104 may have a variety of predetermined traffic management actions, for example:

The traffic management action could be to shape all traffic in a subscriber equal manner which is directed for the node under control. The shaper rate may be set according to the control module 102, where the control module output may be treated as a multiplier against the current shaper rate.

Example:

Current Shape Rate: 10 Mbps

Control module output: 10

New Shaper Rate: 10 Mbps+10*100 Kbps=11 Mbps

The new action may be applied on the interval of the control module 102 and may continue being applied in real time until the control module 102 provides a new output.

The action could be to lower the priority of certain types of traffic based on protocol, such as real-time vs. non real-time, video vs. bulk/p2p, etc.

The action could be to reprioritize users with traffic flowing through the node, where the output of the controller indicates how heavy, and how many subscribers to affect. The selection of which subscribers to reprioritize could be based on subscriber personas (real-time vs. bulk vs. garners), human vs. machine traffic (e.g stop lights, ATMs), heavy vs. non-heavy users, subscriber tiers, etc.

The action could be to reprioritize subscribers/traffic using PacketCable™ multimedia (PCMM) on DOCSIS 3 networks.

The action could be to reprioritize subscribers and/or traffic using Diameter Gx on a 3GPP, long term evolution (LTE) network to an inline PCEF (Policy Charging Enforcement Function).

The action could be to mark specific flows for lower priority subscribers and/or traffic flows for downstream enforcement.

The action could be to change bearer priorities for flows for reprioritized subscribers and/or traffic flows.

The action could be to perform tunnel endpoint identifier (TEID) rewrites for flows for deprioritized subscribers/flows.

It will be understood that any of various traffic management methods, now known or hereafter developed, may be applied using the system 100 and method 200.

In some cases, multiple instances of the traffic management system 100 may be used in order to control multiple traffic flows passing over a single link. The control module 102 may include a classification module which may use traffic classification to associate traffic flows with a correct instance. For example, classification by location could be accomplished by making the system 100 "subscriber aware", for example, where the location of the subscriber is fed to the system 100 through a specific subscriber attribute. The subscriber attribute may be stored in the subscriber database 101. The subscriber attribute may represent, for example, the subscribers location, such as which CMTS the subscriber is connected to (in a Cable network), the DSLAM the subscriber is connected to (in a DSL network), under which Cell/Node B/RNC the subscriber is connected (in a 3GPP wireless network), or the like. It will be understood that the traffic management system may also act based on other subscriber attributes available in the subscriber database 101.

The classification may be based on, for example, the destination cell of a mobile network; the destination Node B of a mobile network; the destination RNC of a 3GPP mobile network; the destination SGSN of a 3GPP mobile network; the destination quadrature amplitude modulation (QAM) of a cable network; the destination DSLAM of a DSL network, the protocol (e.g. L3, L4, and application protocol type) or the like. The method, similar to the method described above, may be applied in parallel and independently for each destination.

In some cases, the traffic management system and method may include data storage for storing the various data used in the system and method for future reference, for example, for auditing purposes.

In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine, hardware circuit, firmware, or a combination thereof.

Embodiments of or elements of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for managing network traffic comprising:
a quality of experience (QoE) measurement module configured to monitor a QoE metric in real-time;
a control module configured to periodically receive the QoE metric and determine a traffic management action based on the QoE metric, the control module comprises:
a data store for storing QoE metric data;
an analysis module for analyzing QoE metric data, wherein the analysis uses one or more previous stored QoE metric data in analyzing the QoE metric data via a feedback loop, and preparing an output action; and
an output module for outputting the output action for the control module to determine the traffic management action based on the output action; and
a traffic management module configured to apply the traffic management action to the network traffic.

2. A system according to claim 1, wherein the analysis module is configured to calculate a variable related to the QoE metric over a time interval.

3. A system according to claim 2, wherein the variable related to the QoE metric is selected from a group consisting of: a change of the QoE metric, a rate of change of the QoE metric, and a function of the change in the QoE metric and a rate of change of the QoE metric.

4. A system according to claim 1, wherein the control module further comprises a classification module that is configured to receive classification information related to a characteristic of the network traffic and the traffic management action is also based on the classification information.

5. A system according to claim 1, wherein the traffic management action is selected from a group consisting of: shaping traffic flow, reprioritizing traffic flows using PacketCable multimedia, reprioritizing traffic flows using Diameter Gx, reprioritizing traffic flows based on subscriber driven traffic, reprioritizing traffic flows based on machine driven traffic, reprioritizing traffic flows via tunnel endpoint identification rewrites, reprioritizing traffic flows via a bearer creation, receiving a lower priority for downstream enforcement for traffic flows, and packet marking.

6. A system according to claim 1, wherein the control system uses logic selected from a group consisting of: adaptive approximation, fuzzy logic, neural networks, genetic algorithms, linear time invariant (LTI) control, and proportional-integral-derivative (PID) control.

7. A system according to claim 1, wherein the QoE metric is selected from a group consisting of: an access round trip time, a number of measured retransmitted packets, a number of measured duplicate transmission control protocol (TCP) acknowledgments (ACKS), a measured voice over internet protocol (VOIP) mean opinion score (MOS) value, a time to render a hypertext transfer protocol (HTTP) page, a mean time to HTTP load, a video gaming jitter value, a video gaming latency, a ping response time, a domain name system (DNS) response time, a throughput of bulk transfers, a video quality of experience metric, a third party quality of experience metric, and a result of a speed test.

8. A system according to claim 1, wherein determining the traffic management action comprises classifying a traffic flow based on at least one of: a destination cell of a mobile network; a destination node of a mobile network; a destination radio network controller (RNC) of a Third Generation Partner Program (3GPP) mobile network; a destination service general packet radio service support node (SGSN) of a 3GPP mobile network; a destination quadrature amplitude modulation (QAM) of a cable network; a destination Digital Subscriber Line Access Multiplexer (DSLAM) of a Digital Subscriber Line (DSL) network; and a protocol type.

9. A method for managing network traffic comprising:
monitoring a quality of experience (QoE) metric in real-time, via a QoE measurement module;
storing QoE metric data in a data store;
analyzing the stored QoE metric data and preparing an output action, via an analysis module, wherein analyzing the QoE metric data comprises analyzing the QoE metric data and using one or more stored QoE metric data in analyzing the QoE metric data via a feedback loop;
outputting the output action, via an output module;
determining a traffic management action based on the QoE metric and the output action; and
applying the traffic management action in real-time to the network traffic, via a traffic management module.

10. A method according to claim 9, wherein the analyzing the stored QoE metric data comprises calculating a variable related to the QoE metric data over a time interval.

11. A method according to claim 10, wherein the variable related to the QoE metric is selected from a group consisting of: a change of the QoE metric, a rate of change of the QoE metric, and a function of the change in the QoE metric and a rate of change of the QoE metric.

12. A method according to claim 9, further comprising receiving classification information related to a characteristic of the network traffic and wherein the determining the traffic management action is also based on the classification information.

13. A method according to claim 9, wherein the traffic management action is selected from the group consisting of: shaping traffic flow, reprioritizing traffic flows using PacketCable multimedia, reprioritizing traffic flows using Diameter Gx, reprioritizing traffic flows based on subscriber driven traffic, reprioritizing traffic flows based on machine driven traffic, reprioritizing traffic flows via tunnel endpoint identification rewrites, reprioritizing traffic flows via a bearer creation, receiving a lower priority for downstream enforcement for traffic flows, and packet marking.

14. A method according to claim 9, wherein the determining the traffic management action comprises using logic selected from the group consisting of: adaptive approximation, fuzzy logic, neural networks, genetic algorithms, linear time invariant (LTI) control, and proportional-integral-derivative (PID) control.

15. A method according to claim 9, wherein the quality of experience metric is selected from the group consisting of: an access round trip time, a number of measured retransmitted packets, a number of measured duplicate TCP ACKs, a measured VOIP MOS value, a time to render an HTTP page, a mean time to HTTP load, a video gaming jitter value, a video gaming latency, a ping response time, a DNS response time, a throughput of bulk transfers, a video QoE metric, a third party QoE metric, and a result of a speed test.

16. A method according to claim 9, wherein determining the traffic management action comprises classifying a traffic flow based on at least one of: a destination cell of a mobile network, a destination node of a mobile network, a destination RNC of a 3GPP mobile network, a destination SGSN of a 3GPP mobile network, a destination QAM of a cable network, a destination DSLAM of a DSL network; and a protocol type.

17. A system for managing network traffic comprising:
a quality of experience (QoE) measurement module configured to monitor a QoE metric in real-time;
a control module configured to periodically receive the QoE metric and report a traffic management action based on the QoE metric, the control module comprises:
a data store for storing QoE metric data;
an analysis module for analyzing QoE metric data, wherein the analysis uses one or more previous stored QoE metric data in analyzing the QoE metric data via a feedback loop, and preparing an output action; and
an output module for outputting the output action for the control module to determine the traffic management action based on the output action; and
a traffic management module configured to receive and apply an adjusted traffic management action to the network traffic.

* * * * *